(No Model.)

A. EISENBART.
BUTTONHOLE CUTTER.

No. 561,775.  Patented June 9, 1896.

Witnesses:
J. H. Shumway
Lillian D. Kelsey

August Eisenbart
Inventor
By attys
Earle Seymour

UNITED STATES PATENT OFFICE.

AUGUST EISENBART, OF BRISTOL, CONNECTICUT.

BUTTONHOLE-CUTTER.

SPECIFICATION forming part of Letters Patent No. 561,775, dated June 9, 1896.

Application filed December 9, 1895. Serial No. 571,489. (No model.)

*To all whom it may concern:*

Be it known that I, AUGUST EISENBART, of Bristol, in the county of Hartford and State of Connecticut, have invented a new Improvement in Buttonhole-Cutters; and I do hereby declare the following, when taken in connection with the accompanying drawings and the letters of reference marked thereon, to be a full, clear, and exact description of the same, and which said drawings constitute part of this specification, and represent, in—

Figure 1:
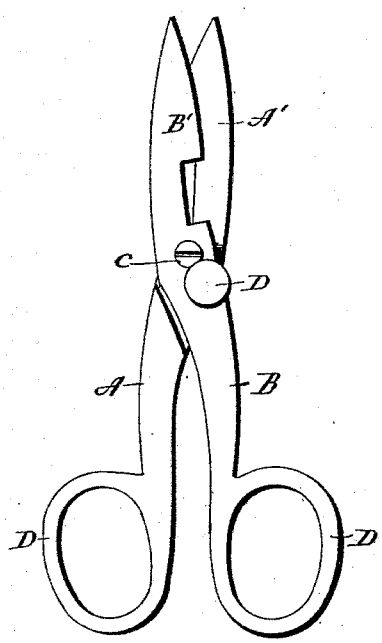
Figure 2:
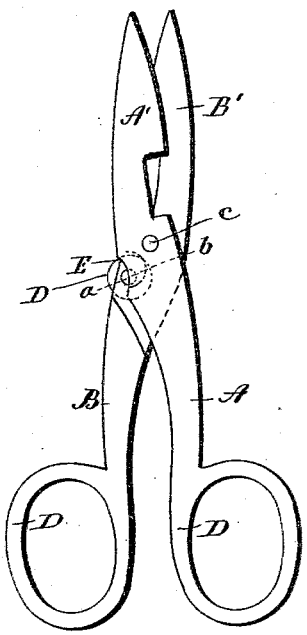
Figure 3:
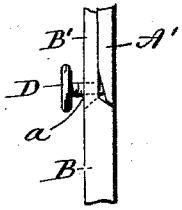
Figure 4:

Figure 1, a face view; Fig. 2, a reverse view; Fig. 3, an edge view; Fig. 4, a section on line $a\,b$ of Fig. 2.

This invention relates to an improvement in buttonhole-cutters, and particularly to such as are in the form of scissors or shears and with which an adjusting device is arranged, whereby the length of the cut may be regulated, the object of the invention being to arrange a regulating device which is easily adjusted and which will not be accidentally changed; and it consists in the construction as hereinafter described, and particularly recited in the claim.

The shanks A B and cutting-blades A' B' are substantially the usual construction, united by a screw-pivot C and the shanks furnished with finger-loops D D. Transversely through the face of one of the shanks, B, and parallel with the pivot C is a threaded opening $a$, into which is turned a screw D, having a flat head. The edge of the other shank, A, is formed with a notch E in the path of the end of the screw D, and the inner face of the said shank is formed with a tapered undercut or recess $b$, extending inward from said notch, as clearly shown in Fig. 4, and so that as the screw is turned in or out its end will be engaged at different points in the recess, so as to permit the blades A' B' to be closed to a greater or less degree. Thus if the screw is turned so that its point does not project beyond the inner face of the shank B the loops may be brought together, so as to completely close the blades A' B'. On the other hand, as the screw is turned inward the shank A will strike against it, so as to limit the closing movement, and when the screw is turned so as to project beyond the edge of the shank A the lower ends of the blades A' B' will just meet. Thus the length of the cut is readily adjusted. By arranging the screw through the shank near the pivot and making its outer face smooth it is less liable to be accidentally turned by sliding across the table or cutting-board than when it is arranged at other points in the shanks, and is in a more convenient position for adjustment.

Preferably I arrange a spring E upon the shank of the screw so as to take a bearing beneath the head of the screw and against the face of the shank, which spring assists in preventing the accidental rotation of the screw.

I claim—

The herein-described buttonhole-cutters, comprising pivoted shanks and cutting-blades, and an adjusting-screw extending through the face of one of the shanks parallel with the pivot, and in the path of movement of the other shank, said other shank formed with a notch in its outer edge adjacent to said screw, and an inclined recess extending inward from said notch, substantially as described.

In testimony whereof I have signed this specification in the presence of two subscribing witnesses.

AUGUST EISENBART.

Witnesses:
　GUSTAV V. HAUSEN,
　A. J. CLAYTON.